(12) United States Patent
Kawano

(10) Patent No.: US 11,102,363 B2
(45) Date of Patent: Aug. 24, 2021

(54) DISPLAY DEVICE AND NON-TRANSITORY COMPUTER-READABLE STORAGE MEDIUM STORING PROGRAM

(71) Applicant: SEIKO EPSON CORPORATION, Tokyo (JP)

(72) Inventor: Yo Kawano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/133,705

(22) Filed: Dec. 24, 2020

(65) Prior Publication Data

US 2021/0203797 A1 Jul. 1, 2021

(30) Foreign Application Priority Data

Dec. 26, 2019 (JP) .............................. JP2019-235901

(51) Int. Cl.
*H04N 1/00* (2006.01)
(52) U.S. Cl.
CPC ..... *H04N 1/00506* (2013.01); *H04N 1/00408* (2013.01); *H04N 1/00477* (2013.01)
(58) Field of Classification Search
CPC ........... H04N 1/00506; H04N 1/00501; H04N 1/00408; H04N 1/00477; H04N 1/00456; H04N 1/00469; G06F 3/1208
See application file for complete search history.

(56) References Cited

U.S. PATENT DOCUMENTS

| | | | | |
|---|---|---|---|---|
| 2013/0163023 | A1* | 6/2013 | Tomono | H04N 1/00474 358/1.13 |
| 2015/0363103 | A1* | 12/2015 | Natsuyama | G06F 3/04886 715/773 |
| 2016/0065766 | A1* | 3/2016 | Miyamoto | H04N 1/00506 358/1.13 |
| 2018/0300771 | A1* | 10/2018 | Roger | G06F 16/9566 |
| 2019/0236813 | A1* | 8/2019 | Yonetsuji | G06N 3/0454 |

FOREIGN PATENT DOCUMENTS

| | | |
|---|---|---|
| JP | 2007-274030 A | 10/2007 |
| JP | 2009-296397 A | 12/2009 |
| JP | 2019-045931 A | 3/2019 |

\* cited by examiner

*Primary Examiner* — Iriana Cruz

(74) *Attorney, Agent, or Firm* — Global IP Counselors, LLP

(57) ABSTRACT

An image selection function of a printer determines permission areas in which superimposition of an object is allowed, and selects a target image from among receptive images in which the object can be fitted in the determined permission areas, among a plurality of images.

6 Claims, 10 Drawing Sheets

| PRINTER STATUS | OBJECT |
|---|---|
| NORMAL OPERATION | PRINTER IS IN OPERATION |
| | IN OPERATION |
| PAPER JAM ERROR OCCURRENCE | PAPER JAM IS OCCURRING |
| | PAPER JAM |
| | ERROR |

DISPLAY DEVICE AND NON-TRANSITORY COMPUTER-READABLE STORAGE MEDIUM STORING PROGRAM

The present application is based on, and claims priority from JP Application Serial Number 2019-235901, filed Dec. 26, 2019, the disclosure of which is hereby incorporated by reference herein in its entirety.

BACKGROUND

1. Technical Field

The present disclosure relates to a display device and a non-transitory computer-readable storage medium storing a program.

2. Related Art

JP-A-2019-045931 discloses a display control device provided with a first output unit that divides an image into a plurality of areas and outputs each of the divided areas on a screen while allowing a user to select it as an arrangement area or a non-arrangement area, and a second output unit that prioritizes arrangement areas over non-arrangement areas and outputs the image by overlapping an object on a prioritized area.

However, in a technique described in JP-A-2019-045931, when an arrangement area in the prepared image does not have enough space, the object needs to be arranged in a non-arrangement area, and therefore more improved display technique is required.

SUMMARY

In a display device and a non-transitory computer-readable storage medium storing a program according to an aspect of the present disclosure, an image on which an object can be arranged is automatically selected from a plurality of images, and thereby arrangement of the object on a non-arrangement area can be avoided. More specifically, the display device includes an acquisition unit that acquires a plurality of images and an object, an image selection unit that selects, from the plurality of images, a target image on which the object is superimposed, and a display control unit that displays the target image with the object superimposed thereon. The image selection unit determines permission areas on which superimposition of the object is allowed for the plurality of images, and selects a target image from among receptive images in which the object can be fitted in the determined permission areas, among the plurality of images.

DESCRIPTION OF EXEMPLARY EMBODIMENTS

Figure 1:
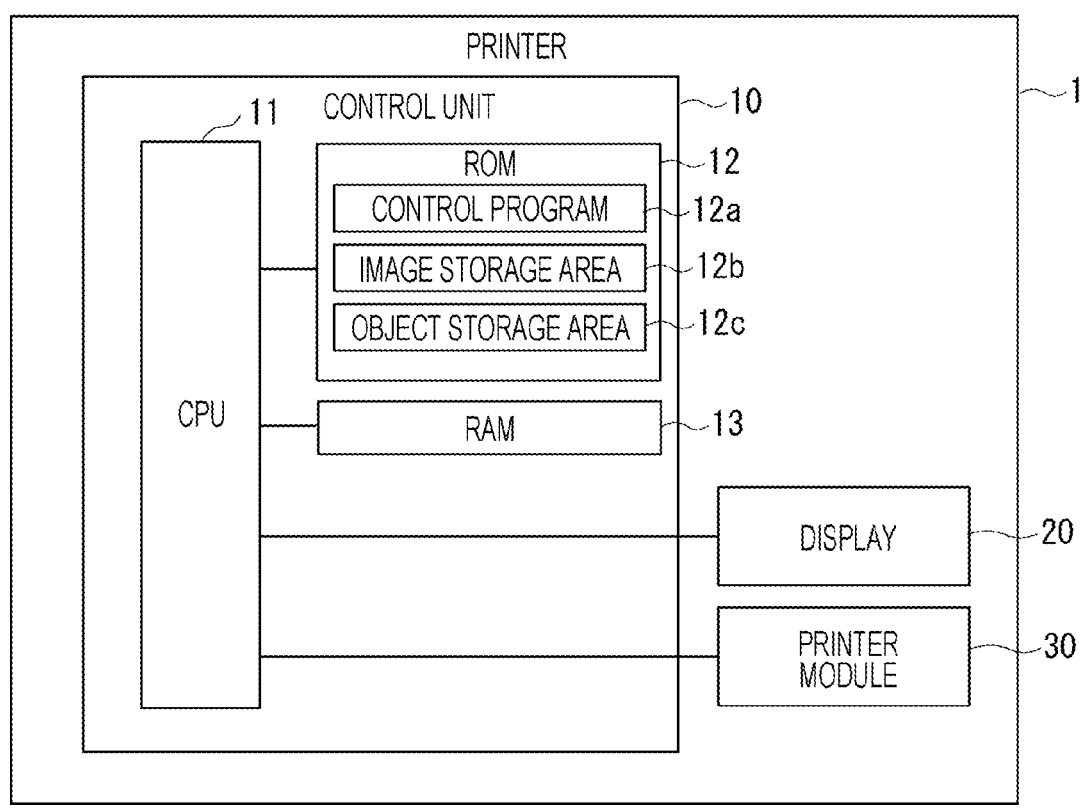
FIG. 1 is a control block diagram showing a hardware configuration of a printer.

A display device according to one embodiment of the present disclosure will be explained below with reference to the drawings. In this embodiment, a printer 1 provided with a display 20 is shown as an example of the display device. The printer 1 is a printer to be installed at a company or the like. FIG. 1 is a control block diagram showing a hardware configuration of the printer 1. The printer 1 includes a control unit 10, the display 20, and a printer module 30.

The control unit 10 includes a central processing unit (CPU) 11, a read only memory (ROM) 12, and a random access memory (RAM) 13. The CPU 11 executes a control program 12a, which will be described later, to control each unit of the printer 1 by loading the program 12a into the RAM 13.

The ROM 12 is a non-volatile storage medium and stores the control program 12a. In addition, the ROM 12 includes an image storage area 12b and an object storage area 12c.

Figure 2:
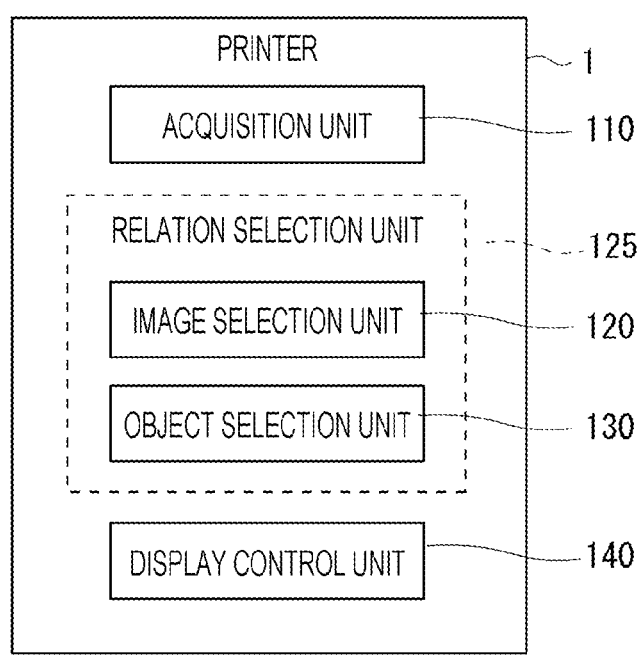
FIG. 2 is a functional block diagram showing a functional configuration of the printer.
Figure 3:
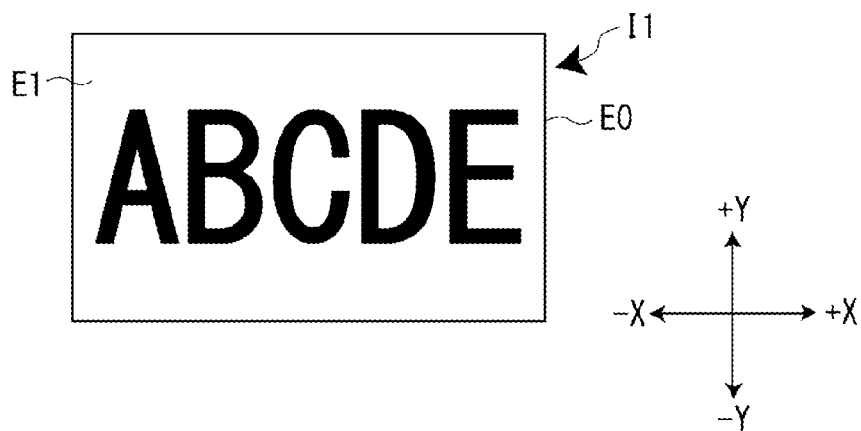
FIG. 3 shows an example of a first image.

The control program 12a is a program that the CPU 11 uses to perform various controls. The image storage area 12b is an area that stores an image I (see FIG. 2, etc.). In this embodiment, the image storage area 12b stores a plurality of images I. The object storage area 12c is an area that stores objects OJ (see FIG. 7, etc.). According to a status of the printer 1, the CPU 11 selects an object OJ indicating the status of the printer 1, and selects an image I on which the selected object OJ can be superimposed, from among the plurality of images I stored in the image storage area 12b. The image I is an image showing a logo of a company at which the printer 1 is installed, for example. In the examples of FIG. 3 and other figures, a string of characters "ABCDE" indicates the logo.

The RAM 13 is a volatile storage medium. The CPU 11 uses the RAM 13 as a work area when performing various controls.

Note that the control unit 10 may use a processor other than the CPU 11. The processor may be formed of a hardware circuit, such as an application specific integrated circuit (ASIC). In addition, the processor may be formed of at least one CPU and a hardware circuit, such as an ASIC, operating in cooperation with each other.

The display 20 displays various kinds of information. When, according to the status of the printer 1, the CPU 11 determines that the object OJ is required to be displayed, the CPU 11 superimposes the object OJ on the image I and displays the resulting image on the display 20. When the CPU 11 determines that the object OJ is not required to be displayed, the CPU 11 displays only the image I on the display 20. For example, during a normal operation or during occurrence of an error, the CPU 11 determines that the object OJ is required to be displayed, and when the printer 1 is in a stand-by state, the CPU 11 determines that the object OJ is not required to be displayed. Note that the object OJ of the present disclosure includes any images to be displayed other than the image I. Examples of the object OJ include messages, icons, and buttons.

The printer module 30 is a print mechanism that performs printing on print media. For example, when the printer 1 is an ink jet printer, the printer module 30 includes an ink jet head, a head drive mechanism, a print medium carrying mechanism, and so on. Note that the print medium for the printer 1 according to this embodiment is paper.

Next, a functional configuration of the printer 1 will be explained with reference to FIG. 2. The printer 1 includes, as a functional configuration, an acquisition unit 110, an image selection unit 120, an object selection unit 130, and a display control unit 140. These units are functions realized by the CPU 11 executing the control program 12a. Therefore, these units can be considered also as an acquisition function 110, an image selection function 120, an object selection function 130, and a display control function 140.

The acquisition unit 110 acquires a plurality of images I from the image storage area 12b and objects OJ from the object storage area 12c. The acquisition unit 110 may acquire some of or all of the plurality of images I and the objects from an external source, such as a server on a network. The image selection unit 120 selects, from the acquired images I, a target image on which an object OJ is superimposed. The object selection unit 130 selects, from the acquired objects OJ, an object OJ to be displayed. Although the details will be described later, the object selection unit 130 selects, as the object OJ, a priority object OJ1 or a related object OJ2. The display control unit 140 displays, on the display 20, the target image selected by the image selection unit 120 with the object OJ selected by the object selection unit 130 superimposed thereon.

Next, images I stored in the image storage area 12b will be explained with reference to FIGS. 3 to 6. The images I are provided by a company or the like at which the printer 1 is installed, in other words, provided by a customer for the manufacturer or the provider of the printer 1. The company or the like, at which the printer 1 is installed, is hereinafter referred to as the "customer".

The images I provided by the customer are divided into three types. An image I of a first type is an image in which superimposition of an object OJ is not allowed throughout an image area E0, which is a display area for the image I. An image I of a second type is an image in which superimposition of an object OJ is allowed only in a part of the image area E0, the part being specified by the customer. An image I of a third type is an image in which superimposition of an object OJ is allowed in the image area E0 except for logo area. Each of the images I stored in the image storage area 12b is provided with information indicating the first type, the second type, or the third type.

Because superimposition of an object OJ is not allowed for an image I of the first type, the image I is displayed when the CPU 11 determines that an object OJ is not required to be displayed, that is, during a stand-by state of the printer 1.

An image I of the second type or an image I of the third type is displayed when the CPU 11 determines that an object OJ is required to be displayed, that is, when the printer 1 is in a normal operation or when an error is occurring. A method for selecting an image I and a method for selecting an object OJ will be described later. Note that operation for storing images I in the image storage area 12b of the printer 1 may be performed by a person of the customer side or a person of the manufacturer or provider of the printer 1.

Now, the images I will be explained by using specific examples. FIG. 3 shows an example of a first image I1. The first image I1 is an example of an image I of the first type. A whole image area E0 of the first image I1 is a non-permission area E1 in which superimposition of an object OJ is not allowed. Note that, the image area E0 of the first image I1 corresponds to a screen area of the display 20. The same is true for a second image I2, a third image I3, and a fourth image I4, which will be explained blow.

Figure 4:
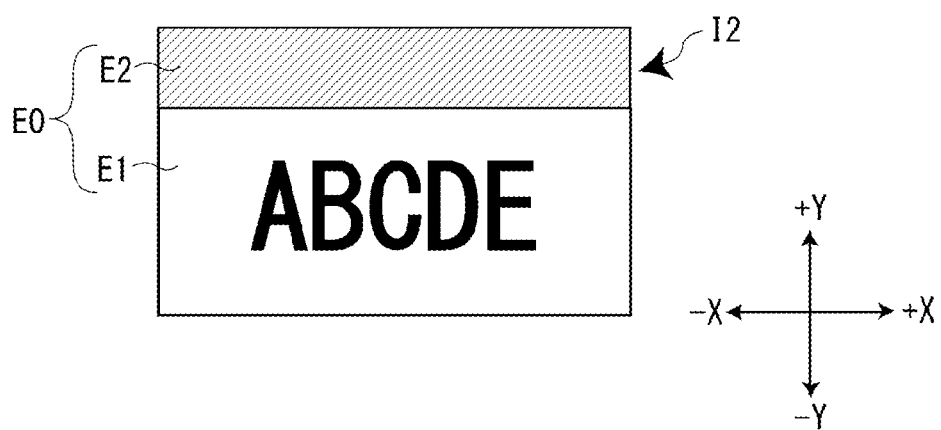
FIG. 4 shows an example of a second image.

FIG. 4 shows an example of a second image I2. The second image I2 is an example of an image I of the second type. In the second image I2, a partial area on the positive Y side of the image area E0 is a permission area E2 in which superimposition of an object OJ is allowed, and the remaining area is a non-permission area E1.

Figure 5:
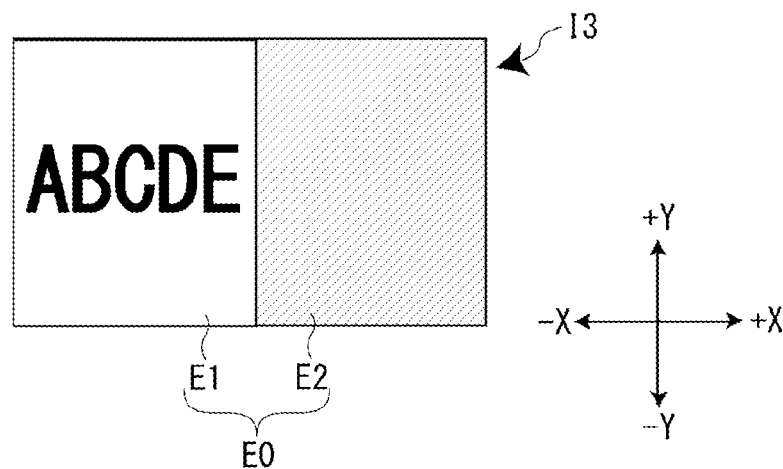
FIG. 5 shows an example of a third image.

FIG. 5 shows an example of a third image I3. The third image I3 is another example of an image I of the second type. In the third image I3, a substantially half area of the image area E0 on the positive X side is a permission area E2, and the remaining area is a non-permission area E1.

Figure 6:
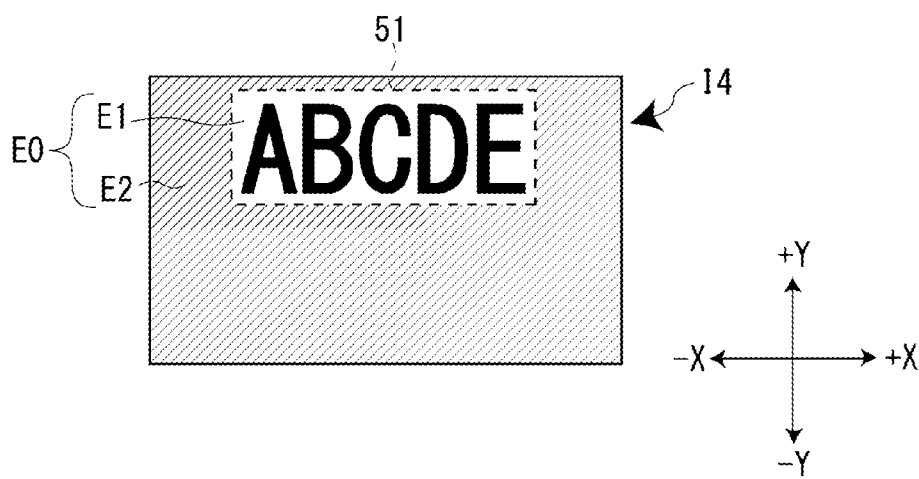
FIG. 6 shows an example of a fourth image.

FIG. 6 shows an example of a fourth image I4. The fourth image I4 is an example of an image I of the third type. When an image I of the third type, like the fourth image I4, is stored in the image storage area 12b, the CPU 11 detects a logo by image recognition and determines a detection area 51 that includes the detected logo. In this case, the inside of the detection area 51 is a non-permission area E1, and the image area E0 except for the non-permission area E1 is a permission area E2. In addition, in a case of an image of the third type, the non-permission area E1 can be arranged at any position in the image area E0. A method for determining the position of the non-permission area E1 in the image area E0 will be explained later.

Note that the first image I1, the second image I2, the third image I3, and the fourth image I4 shown in FIGS. 3 to 6 may be original images provided by the customer, or may be obtained by automatically adjusting the images provided by the customer in at least one of X-direction and Y-direction of the display 20 according to the size of the screen.

Figures 7, 8:
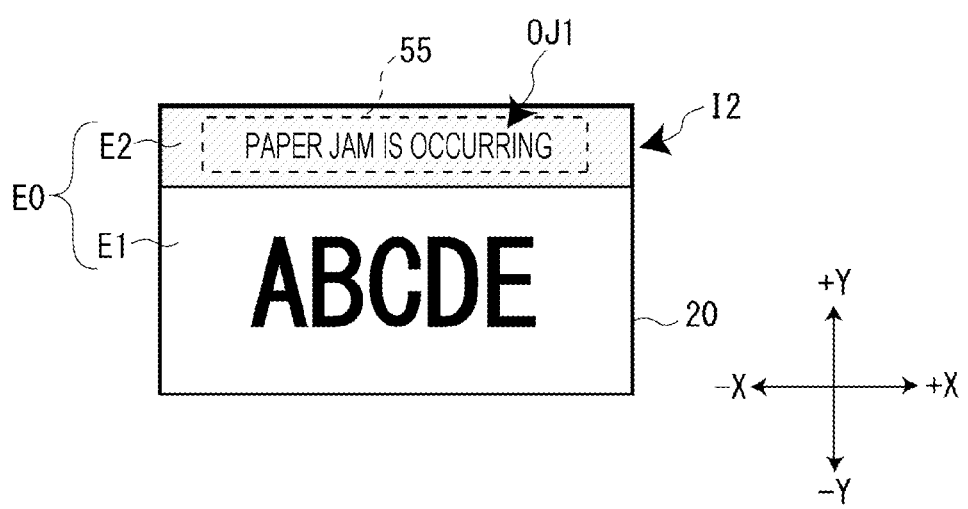
FIG. 7 shows examples of object.
FIG. 8 shows a display example in which a priority object is superimposed on the second image.

Next, objects OJ stored in the object storage area 12c will be explained with reference to FIG. 7. In the object storage area 12c, at least one object OJ is stored for each status of the printer 1. FIG. 7 shows a case in which the object storage area 12c stores two objects that are displayed during a normal operation of the printer 1 and three objects that are displayed when a paper jam error occurs. Note that the paper jam error means a paper jam that might be generated when a print medium carrying mechanism of the printer 1 carries a sheet of paper.

When the object storage area 12c stores more than one object OJ for a status of the printer 1, a priority order is set for each object OJ. Hereinafter, an object having the highest priority order is referred to as a priority object OJ1. The priority object OJ1 is an object OJ that is selected first in display processing (see FIGS. 13 to 15), which will be described later. For example, for the two objects OJ to be displayed during a normal operation, a string of characters "PRINTER IS IN OPERATION" is the priority object OJ1, and for the three objects OJ to be displayed when a paper jam error occurs, a string of characters "PAPER JAM IS OCCURRING" is the priority object OJ1.

Note that objects OJ at the second line or below for each status are related objects OJ2. A related object OJ2 has a smaller object area 55 (see FIG. 8), which is a display area for an object OJ, compared with the priority object OJ1.

In addition, when there are more than one related object OJ2, such as objects OJ to be displayed at a paper jam error, the priority order of the related objects OJ2 is determined in descending order of the size of the display areas. When the objects OJ are strings of characters and the text size thereof are the same among the objects OJ, the CPU 11 determines the priority of the related objects OJ2 in descending order of the number of characters. Therefore, for the related objects OJ2 to be displayed at a paper jam error, the priority for a string of characters "ERROR" is lower than that for a string of characters "PAPER JAM". Note that related objects OJ2 may be icons, in addition to characters or strings of characters.

Now, outlines of selection of objects OJ and selection of images I are explained. When the status of the printer 1 is changed, the abovementioned object selection unit 130 (see FIG. 2) selects a priority object OJ1 according to the changed status of the printer 1. In addition, the abovementioned image selection unit 120 determines permission areas E2 for the plurality of images I stored in the image storage area 12b, and selects a target image, which is the image to be displayed, from among the images I in which the selected priority object OJ1 can be fitted in the determined permission areas E2. Hereinafter, an image I in which a priority object OJ1 can be fitted in the permission area E2 thereof is referred to as the "receptive image". However, when two or more receptive images are included in the plurality of images I, the image selection unit 120 selects, as the target image, the image I having the smallest permission area E2 among the two or more receptive images.

When no receptive image is included in the plurality of images I, the image selection unit 120 reduces each of the plurality of images I. A blank space generated thereby in the screen area of the display 20, that is the image area E0, is included in the permission area E2. Therefore, it can be considered that the permission area E2 is enlarged, and the permission area E2 of the reduced image I is determined as an enlarged permission area E2' (see FIG. 11). Then, the image selection unit 120 selects a target image from among the images I in which the priority object OJ1 can be fitted in the determined enlarged permission areas E2', among the plurality of images I. Hereinafter, an image I in which a priority object OJ1 can be fitted in the enlarged permission area E2' is referred to as the "enlargement receptive image". This "enlargement receptive image" is a reduced image of the image I. Note that, for such reduction, because the image I cannot be read when the image I is reduced too much, a limit for reduction ratio may be determined for each image I in advance or a uniform reduction ratio may be determined in advance, or a limit for reduction ratio may be automatically determined to an extent that an image I can be read by analyzing the contents of the image I.

When no enlargement receptive image is included in the plurality of images I, the acquisition unit 110 acquires a related object OJ2, which is related to the priority object OJ1, according to the priority order. Then, when an image I in which the related object OJ2 can be fitted in the permission area E2 is included in the plurality of images I, the object selection unit 130 selects the related object OJ2 in place of the priority object OJ1. Hereinafter, an image I in which a related object OJ2 can be fitted in the permission area E2 is referred to as the "related receptive image". In this case, the object selection unit 130, which selects a related object OJ2, and the image selection unit 120, which selects a related receptive image, are collectively called the "relation selection unit 125". That is, the relation selection unit 125 selects a combination of a related object OJ2 and a related receptive image in which the related object OJ2 can be fitted in the permission area E2, respectively from the related objects OJ2 and the plurality of images I.

Next, with reference to FIGS. 8 to 12, display examples for a case in which an object OJ is superimposed on an image I will be explained by using specific examples. Here, display examples at an occurrence of a paper jam error are shown. For example, the first image I1 (see FIG. 3), the second image I2 (see FIG. 4), the third image I3 (see FIG. 5), and the fourth image I4 (see FIG. 6) are stored in the image storage area 12b, and when, among these images I, the second image I2 and the fourth image I4 are the images I in which a priority object OJ1 can be fitted in the permission areas E2, the image that has a larger non-permission area E1, that is, the second image I2, is selected as a target image by the CPU 11. The image I in which a priority object OJ1 can fitted in the permission area E2 means an image having the permission area E2 that is large enough to receive the entire object area 55 including a priority object OJ1. That is, the CPU 11 selects a target image on a condition that a priority object OJ1 is not superimposed on the permission area E2. In addition, the CPU 11 may determine that the object area 55 is "not superimposed" on the non-permission area E1 when the areas are separated by at least a predetermined distance, and that the object area 55 is "superimposed" on the non-permission area E1 when the areas are not separated by at least a predetermined distance.

FIG. 8 shows a display example in which a priority object OJ1 is superimposed on the second image I2. The CPU 11 arranges the priority object OJ1, which is selected according to the status of the printer 1, at a predetermined position in the permission area E2. In the example of FIG. 8, the CPU 11 arranges the priority object OJ1 at substantially the center of the permission area E2. However, the CPU 11 may arrange the priority object OJ1 at any place as long as the priority object OJ1 stays inside the permission area E2.

In addition, the CPU 11 selects the fourth image I4 as a target image when, for example, only the fourth image I4 is a receptive image among the images I stored in the image storage area 12b. Note that when none of the related objects OJ2 can be fitted in the permission area E2 of any image I, an image I in which any related object OJ2 can be fitted in the enlarged permission area E2' is selected from among the enlargement receptive images. Then, the CPU 11 superimposes the related object OJ2 on the enlarged permission area E2' of the selected enlargement receptive image and displays the resulting image.

Figure 9:
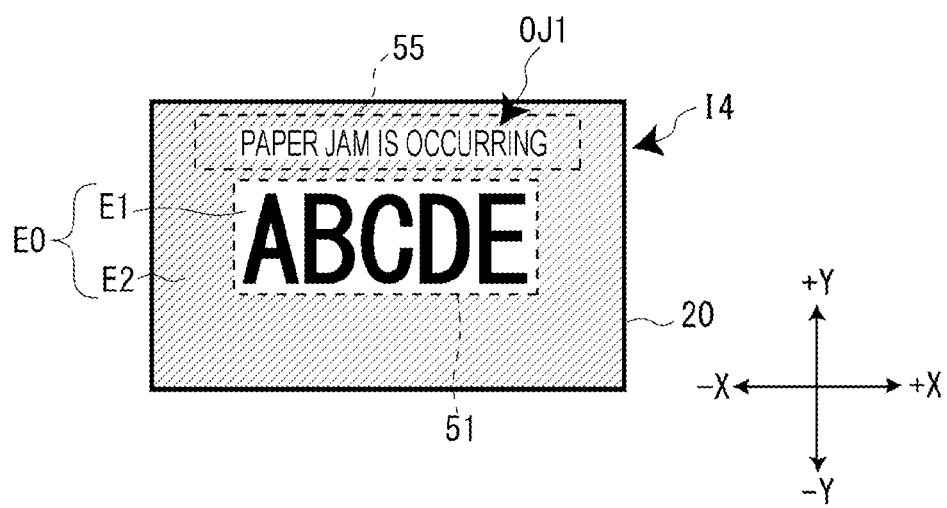
FIG. 9 shows a display example in which the priority object is superimposed on the fourth image.

FIG. 9 shows a display example in which the priority object OJ1 is superimposed on the fourth image I4. When the target image is an image I of the third type like the fourth image I4, the CPU 11 arrange the non-permission area E1, which is the detection area 51 of the logo, at a predetermined position of the image area E0. In the example of FIG. 9, the CPU 11 arranges the non-permission area E1 at substantially the center of the image area E0. Furthermore, the CPU 11 arranges the priority object OJ1, which is selected according to the status of the printer 1, at a predetermined position in the permission area E2. In the example of FIG. 9, the CPU 11 arranges the priority object OJ1 at an end part in a positive Y direction of the permission area E2 and substantially center in an X direction. However, when the CPU 11 cannot arrange the priority object OJ1 at a predetermined position in the permission area E2, the CPU 11 displaces at least one of the position of the priority object OJ1 and the positon of the non-permission area E1.

Note that when the target image is an image I of the third type, various patterns for arranging the priority object OJ1 and the non-permission area E1 in the image area E0 may be considered. The priority object OJ1 and the non-permission area E1 may be arranged with good appearance according to the size of the object area 55 of the priority object OJ1 and the size of the non-permission area E1.

Figure 10:
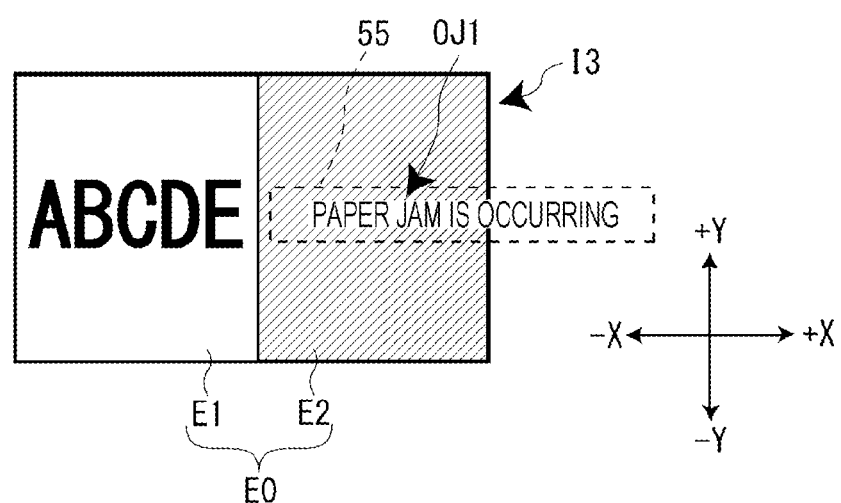
FIG. 10 shows a display example in which the priority object is superimposed on the third image.

Moreover, when, for example, two images I of the first image I1 and the third image I3 are stored in the image storage area 12*b*, because superimposition is not allowed on the first image I1, the CPU 11 determines whether or not the priority object OJ1 can be fitted in the permission area E2 of the third image I3. FIG. 10 shows a display example in which the priority object OJ1 is superimposed on the third image I3. When the priority object OJ1 does not fit in the permission area E2 of the third image I3 as shown in FIG. 10, enlargement processing for enlarging the permission area E2 is performed.

Figure 11:
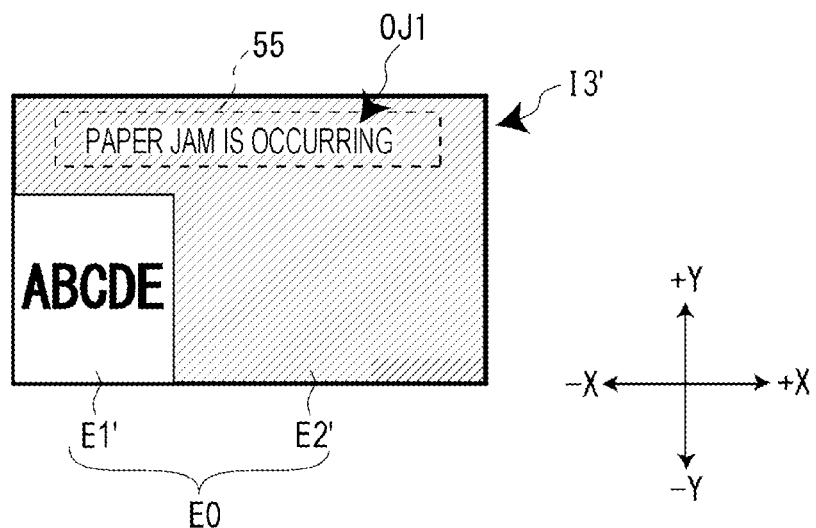
FIG. 11 shows a display example in which the priority object is superimposed on an enlarged third image.

FIG. 11 shows a display example in which the priority object OJ1 is superimposed on an enlarged third image I3' in which the permission area E2 of the third image I3 is enlarged. When no receptive image is included in the image storage area 12*b*, the CPU 11 reduces the third image I3 by a predetermined ratio and determines a reduced non-permission area E1' that is obtained by reducing the non-permission area E1. At this time, the CPU 11 arranges the reduced non-permission area E1', which is obtained by reducing the non-permission area E1, at a predetermined position in the image area E0 and determines an area excluding the reduced non-permission area E1', which is arranged at the predetermined position, from the image area E0 as the enlarged permission area E2'. In the example of FIG. 11, the reduced non-permission area E1' is arranged at an end part in a negative X direction and a negative Y direction of the image area E0.

Furthermore, the CPU 11 arranges the priority object OJ1 selected according to the status of the printer 1 at a predetermined position in the determined enlarged permission area E2'. In the example of FIG. 11, the CPU 11 arranges the priority object OJ1 at an end part in a positive Y direction of the permission area E2 and substantially the center in the X direction. However, when the CPU 11 cannot arrange the priority object OJ1 at the predetermined position in the permission area E2', the CPU 11 displaces at least one of the position of the priority object OJ1 and the positon of the reduced non-permission area E1'.

Moreover, when, for example, two images of the first image I1 and the third image I3 are stored in the image storage area 12*b* and when the priority object OJ1 cannot be fitted in the enlarged permission area E2' of the enlarged third image I3', the CPU 11 selects a related object OJ2 in place of the priority object OJ1.

Figure 12:
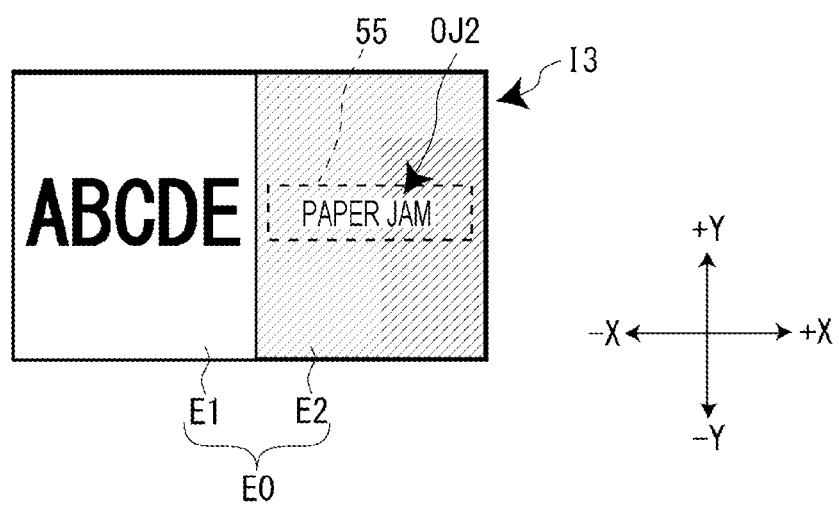
FIG. 12 shows a display example in which a related object is superimposed on the third image.

FIG. 12 shows a display example in which a related object OJ2 is superimposed on the third image I3. When the CPU 11 does not find any image I on which the priority object OJ1 can be superimposed among the plurality of images stored in the image storage area 12*b* even when enlargement processing is performed, the CPU 11 acquires, from the object storage area 12*c*, a related object OJ2 that is related to the priority object OJ1 and has a smaller display area than that of the priority object OJ1. The CPU 11 selects a related receptive image from the plurality of images I. Note that when two or more related receptive images are included in the plurality of images I, the CPU 11 selects, as the target image, the image I having the smallest permission area E2 among the two or more related receptive images.

When the CPU 11 selects the third image I3 as the target image, the CPU 11 arranges the related object OJ2 at a predetermined position in the permission area E2 of the third image I3. In the example of FIG. 12, the CPU 11 arranges the related object OJ2 at substantially the center of the permission area E2. However, when the CPU 11 cannot arrange the related object OJ2 at a predetermined position in the permission area E2, the CPU 11 displaces the position of the related object OJ2.

Next, with reference to FIGS. 13 to 15, a flow of display processing of the printer 1 will be explained. The display processing is processing realized by executing the control program 12*a* by the CPU 11. In addition, the display processing is executed when the status of the printer 1 is changed, that is, an event in which an object OJ needs to be displayed or an event in which switching of objects OJ is required is used as a trigger.

Figure 13:
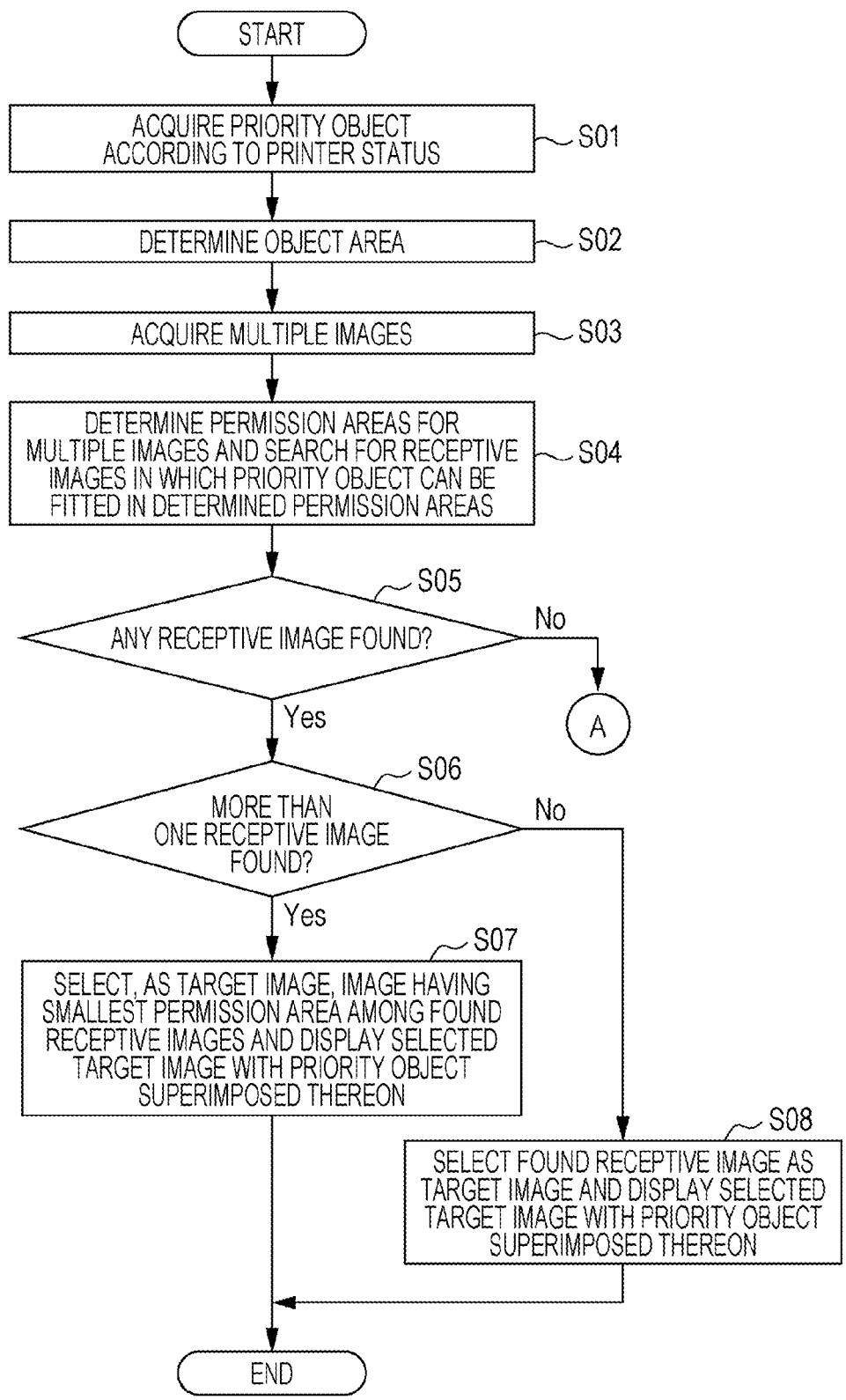
FIG. 13 is a flowchart showing a flow of display processing.

As shown in FIG. 13, in step S01, the CPU 11 acquires, from the object storage area 12*c*, a priority object OJ1 according to the status of the printer 1.

In step S02, the CPU 11 determines an object area 55 of the acquired priority object OJ1. When the priority object OJ1 is formed of characters, the CPU 11 determines the sizes of the object area 55 in the X direction and the Y direction according to the number of characters, the character size, and the font of the characters. In addition, when the priority object OJ1 is formed of an image, the CPU 11 determines the object area 55 according to the size of the image.

In step S03, the CPU 11 acquires a plurality of images I stored in the image storage area 12*b*.

In step S04, the CPU 11 determines a permission area E2 for each of the acquired images I, and searches for a receptive image, which is the image I in which the priority object OJ1 can be fitted in the determined permission area E2 thereof. Here, the CPU 11 determines the permission area E2 by reading the position of the permission area E2 described in the header of each image I. However, the CPU 11 may determine the permission area E2 by reading the position of the permission area E2 described in another place, such as a separate file corresponding to each image I, or the CPU 11 may automatically determine the permission area E2 by analyzing the contents of each image I.

In step S05, the CPU 11 determines whether or not a receptive image is found. When the CPU 11 determines that a receptive image is found, the process proceeds to step S06. When the CPU 11 determines that a receptive image is not found, the process proceeds to step S11 of FIG. 14.

In step S06, the CPU 11 determines whether or not two or more receptive images are found. When the CPU 11 determines that two or more receptive images are found, the process proceeds to step S07. When the CPU 11 determines that two or more receptive images are not found, that is, only one receptive image is found, the process proceeds to step S08.

In step S07, the CPU 11 selects, as a target image, the image I having the smallest permission area E2 among the two or more found receptive images, superimposes the priority object OJ1 on the selected target image, and displays the resulting image on the display 20. The CPU 11 ends the display processing after step S07.

In step S08, the CPU 11 selects the found receptive image as the target image, superimposes the priority object OJ1 on the selected target image, and displays the resulting image on the display 20. The CPU 11 ends the display processing after step S08.

Figure 14:
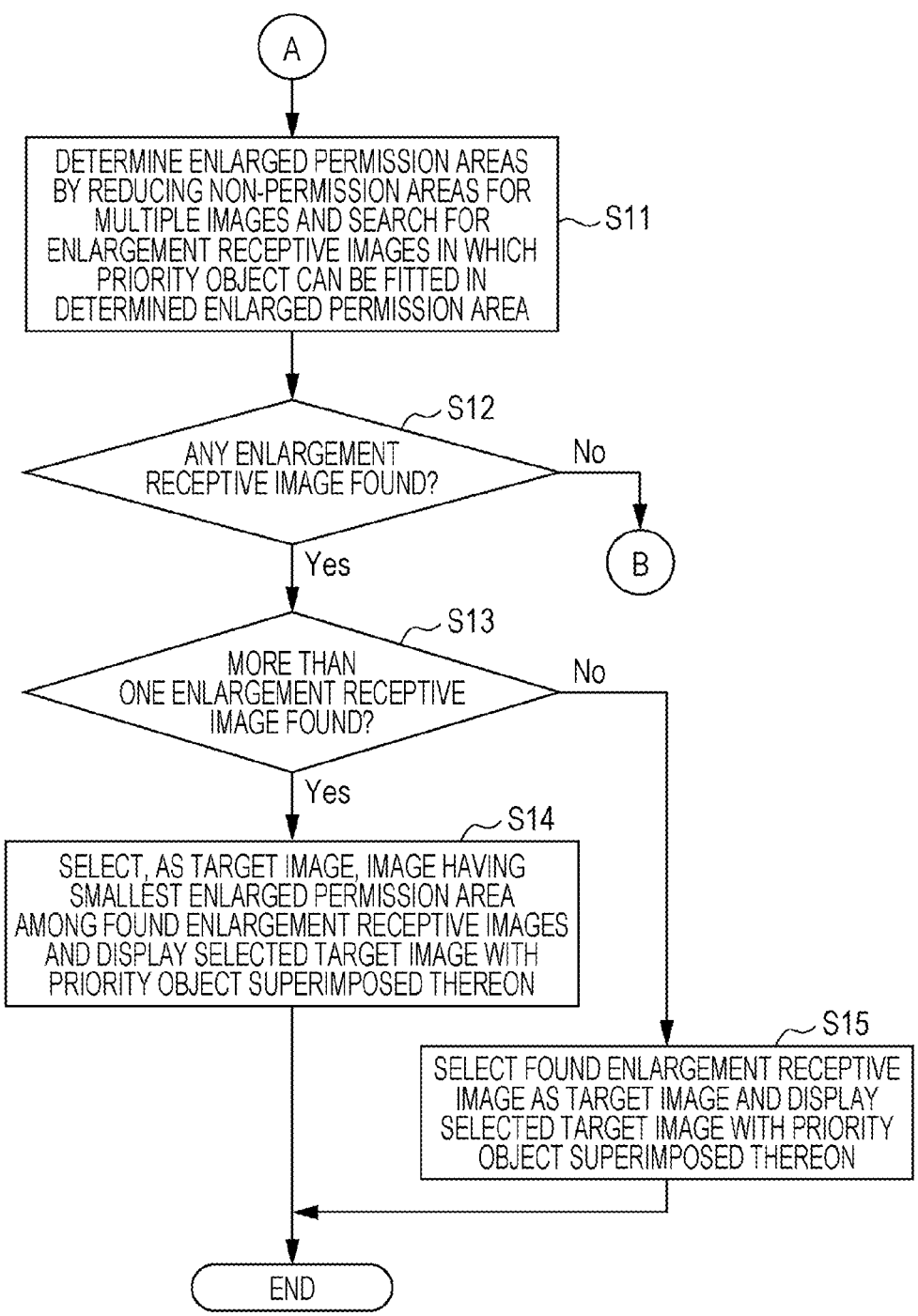
FIG. 14 is a flowchart showing a flow of display processing continued from FIG. 13.

As shown in FIG. 14, in step S11, the CPU 11 determines enlarged permission areas E2' by reducing non-permission areas E1 for the plurality of images acquired in step S03 and searches for an enlargement receptive image, which is an image I in which the priority object OJ1 can be fitted in determined enlarged permission area E2'.

In step S12, the CPU 11 determines whether or not an enlargement receptive image is found. When the CPU 11 determines that an enlargement receptive image is found, the process proceeds to step S13. When the CPU 11 determines that an enlargement receptive image is not found, the process proceeds to step S21 of FIG. 15.

In step S13, the CPU 11 determines whether or not two or more enlargement receptive images are found. When the CPU 11 determines that two or more enlargement receptive images are found, the process proceeds to step S14. When the CPU 11 determines that two or more enlargement receptive images are not found, that is only one enlargement receptive image is found, the process proceeds to step S15.

In step S14, the CPU 11 selects, as a target image, the image I having the smallest enlarged permission area E2' among the two or more found enlargement receptive images, superimposes the priority object OJ1 on the selected target image, and displays the resulting image on the display 20. The CPU 11 ends the display processing after step S14.

In step S15, the 11 selects the found enlargement receptive image as a target image, superimposes the priority object OJ1 on the selected target image, and displays the resulting image on the display 20. The CPU 11 ends the display processing after step S15.

Figure 15:
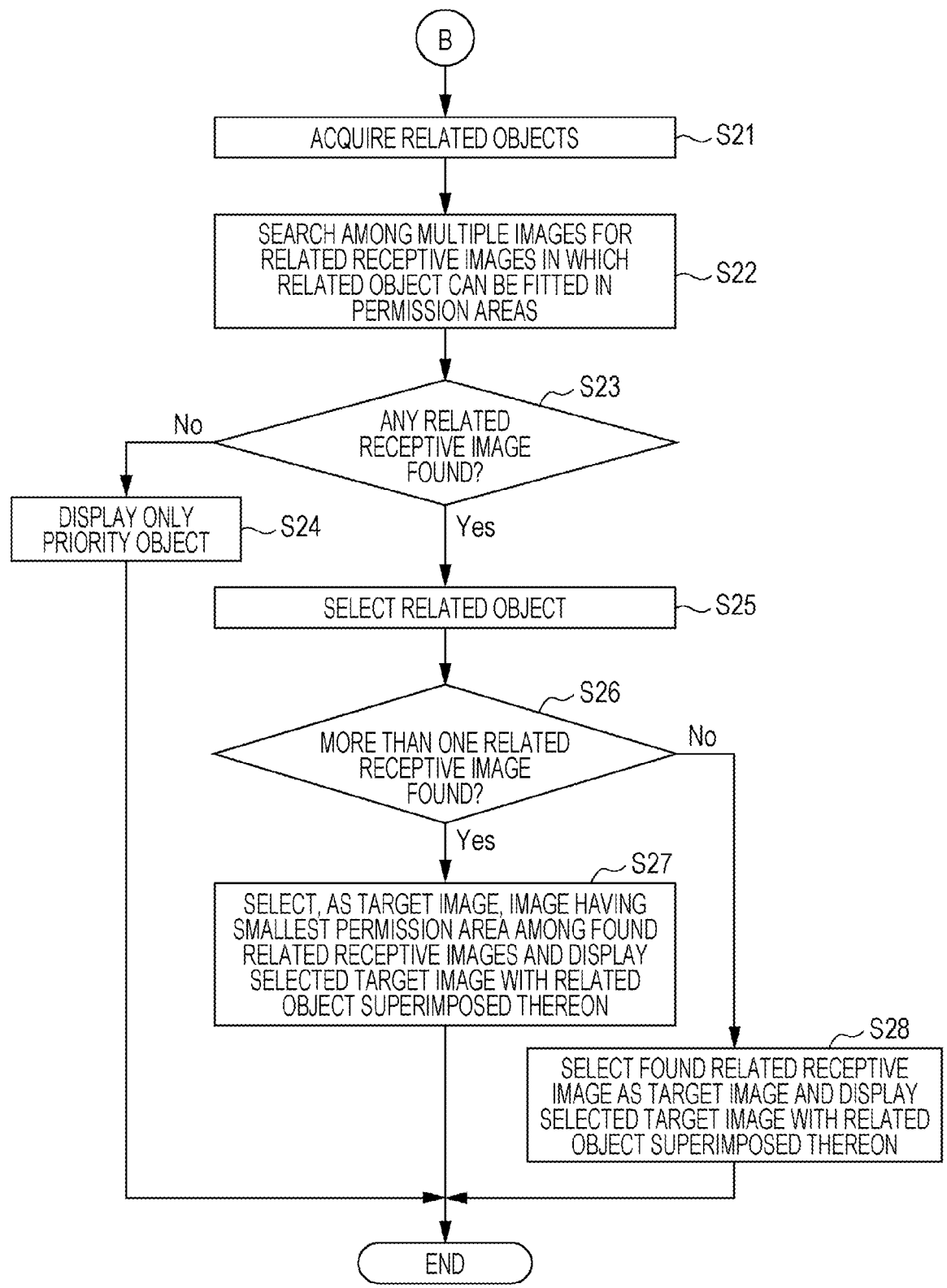
FIG. 15 is a flowchart showing a flow of display processing continued from FIG. 14.

As shown in FIG. 15, in step S21, the CPU 11 acquires, from the object storage area 12c, related objects OJ2 that are related to the priority object OJ1 acquired in step S01 of FIG. 13. That is, the CPU 11 acquires the related objects OJ2 that indicate the same status of the printer 1 as the priority object OJ1 acquired in step S01 indicates.

In step S22, the CPU 11 searches for, among the plurality of images I, a related receptive image that is an image I in which the related object OJ2 can be fitted in the permission area E2. Whether or not the related object OJ2 can be fitted in the permission area E2 is determined by determining, as with the priority object OJ1, whether or not the entire object area 55 including the related object OJ2 can be fitted in the permission area E2. When the CPU 11 acquires more than one related objects OJ2 in step S21, the CPU 11 first searches for a related receptive image in which a related object OJ2 having the highest priority order can be fitted in the permission area E2, and when such a related receptive image is not found, the CPU 11 then searches for a related receptive image in which a related object OJ2 having the second highest priority order can be fitted in the permission area E2. When the CPU 11 finds related receptive images or when the CPU 11 completes the determination of whether or not to fit in the permission area E2 for all of the related objects OJ2, the process proceeds to step S23.

In step S23, the CPU 11 determines whether or not a related receptive image is found. When the CPU 11 determines that a related receptive image is found, the process proceeds to step S25. When the CPU 11 determines that a related receptive image is not found, the process proceeds to step S24.

In step S24, the CPU 11 displays only the priority object OJ1 on the display 20 without displaying the image I. This priority object OJ1 was obtained in step S01 of FIG. 13. The CPU 11 ends the display processing after step S24.

In step S25, the CPU 11 selects a related object OJ2 that can be fitted in the related receptive image. Here, the CPU 11 acquires the related object OJ2 that was determined by the CPU 11 as to whether or not the related object OJ2 can be fitted in the permission area E2 when the related receptive image was found in step S22.

In step S26, the CPU 11 determines whether or not two or more related receptive images are found. When the CPU 11 determines that two or more related receptive images are found, the process proceeds to step S27. When the CPU 11 determines that two or more related receptive images are not found, that is when only one related receptive image is found, the process proceeds to step S28.

In step S27, the CPU 11 selects, as a target image, the image I having the smallest permission area E2 among the two or more found related receptive images, superimposes the related object OJ2 on the selected target image, and displays the resulting image on the display 20. The CPU 11 ends the display processing after step S27.

In step S28, the CPU 11 selects the found related receptive image as a target image, superimposes the related object OJ2 on the selected target image, and displays the resulting image on the display 20. The CPU 11 ends the display processing after step S28.

As described above, in the printer 1 according to the present embodiment, the permission areas E2 are determined for the plurality of images I stored in the image storage area 12b, and the target image on which the priority object OJ1 is superimposed is selected from the receptive images I in which the priority object OJ1 can be fitted in the determined permission areas E2. Therefore, superimposition of the priority object OJ1 on the non-permission area E1 can be avoided.

In addition, when two or more receptive images are included in the plurality of images I, the printer 1 selects, as a target image, the image I having the smallest permission area E2, and thus the printer 1 can select, as the target image, the image I having as large the non-permission area E1 as possible. Therefore, the logo included in the image I can be emphasized as much as possible. In particular, when the size of the display 20 is small and thus the screen needs to be utilized effectively. Thus, the visibility of the logo can be ensured by selecting the image I having as large the non-permission area E1 as possible.

Furthermore, when no receptive image is included in the plurality of images I, the printer 1 determines enlarge permission areas E2' by reducing the non-permission areas E1 to enlarge the permission areas E2 for the plurality of images I, and selects a target image from enlargement receptive images in which the priority object OJ1 can be fitted in the determined enlarged permission areas E2'. As a result, the possibility that the priority object OJ1 cannot be superimposed on the target image can be lowered.

Moreover, when no enlargement receptive image is included in the plurality of images I, the printer 1 acquires a related object OJ2, which has a smaller display area than that of the priority object OJ1, and when a related receptive image in which the related object OJ2 can be fitted in the permission area E2 is included in the plurality of images I, the printer 1 selects the related object OJ2 in place of the priority object OJ1. As a result, even when no target image on which the priority object OJ1 can be superimposed can be selected from the enlargement receptive images, the related object OJ2 can be superimposed and displayed.

Note that the following modification examples can be adopted regardless of the abovementioned embodiment.

Modified Example 1

An image I is formed of a non-permission area E1 and a permission area E2. Thus, determination of the permission area E2 means determination of the non-permission area E1. For example, the permission area E2 may be determined by reading the position of the non-permission area E1, the position being described in the header of the image I or in a separate file corresponding to the image I.

Modified Example 2

In the display processing, the printer 1 performs the enlargement processing for enlarging the permission area E2 when no receptive image is included in the acquired images I. However, without performing the enlargement processing, the printer 1 may display only the priority object OJ1 on the display 20 and end the display processing. That is, when determination result of step S05 in FIG. 13 is No, the process may proceed to step S24 in FIG. 15.

Modified Example 3

Similarly, in the display processing, the printer 1 performs the processing for searching for related receptive images when no enlargement receptive image is included in the acquired images I. However, without performing the processing for searching for related receptive images, the printer 1 may display only the priority object OJ1 on the display 20 and end the display processing. That is, when determination result of step S12 in FIG. 14 is No, the process may proceed to step S24 in FIG. 15.

Modified Example 4

In the display processing, the printer 1 performs the enlargement processing for enlarging the permission area E2 when no receptive image is included in the acquired images I. However, without performing the enlargement processing, the printer 1 may perform the processing for searching for related receptive images. That is, when determination result of step S05 in FIG. 13 is No, the process may proceed to step S21 in FIG. 15.

Modified Example 5

In addition, in the display processing, the printer 1 may perform the enlargement processing after performing the processing for searching for related receptive images. That is, when determination result of step S05 in FIG. 13 is No, the process may proceeds to step S21 in FIG. 15, then when determination result of step S23 in FIG. 15 is No, the process may proceed to step S11 in FIG. 14, and then when determination result of step S12 in FIG. 14 is No, the process may proceed to step S24 in FIG. 15.

Modified Example 6

The image I indicates the logo of the customer, that is the company at which the printer 1 is installed; however, the image I is not limited to a logo. For example, the image I may be a photograph or an illustration. For example, a plurality of images I may include one image showing the logo of the company, two illustration images of a mascot of the company, and three photographs of the appearance of the company.

Modified Example 7

Although the image storage area 12b stores a plurality of images I, the image storage area 12b does not necessarily have to store three types of images I. For example, when the image storage area 12b does not contain an image I of the first type, the printer 1 may display an image I of the second type or third type during standby.

Modified Example 8

Although the printer 1 selects only one object OJ to be displayed, the printer 1 may select more than one object OJ. That is, the printer 1 may select multiple priority objects OJ1 and multiple related objects OJ2 and display the target image with the selected objects superimposed thereon. In this case, the printer 1 may determine whether or not the multiple objects OJ can be fitted in the permission area E2 or the enlarged permission area E2' of the image I.

Modified Example 9

Although an image I of the second type, such as the second image I2 or the third image I3, which contains one non-permission area E1 and one permission area E2 in the image area E0, is shown in the examples, the image I of the second type may contain multiple non-permission areas E1 and multiple permission areas E2. When multiple permission areas E2 are included in the image area E0 and when multiple objects OJ are selected, the printer 1 may dispersedly arrange the multiple objects OJ on the multiple permission areas E2.

Modified Example 10

Related objects OJ2 may be obtained by editing the priority object OJ1. For example, a related object OJ2 may be a reduced image of the priority object OJ1. In addition, when the priority object OJ1 is formed of a string of characters, the string of characters with a line feed may be used as a related object OJ2. In this case, the CPU 11 may determine the position of a line feed from among candidates of line feed position, which are set in advance, at the timing of layout determination. Note, however, that the printer 1 may store a string of characters with a line feed as a related object OJ2 before shipment.

Modified Example 11

Although the printer 1 includes the image storage area 12b and the object storage area 12c, the printer 1 may be so configured that at least one of a group of images I and a group of objects OJ is acquired from an external device, such as a web server, or from an external storage medium, such as a memory card inserted into the printer 1.

Modified Example 12

A method for executing each process of the printer 1 shown in the abovementioned embodiment and in each modified example, a program for executing each process, and a computer-readable storage medium storing the program are included in the scope of the disclosure. Furthermore, in place of the printer 1, an electronic device having a display function may be used as a display device. Moreover, as the printer 1 shown in the abovementioned embodiment and in each modified example, a plurality of devices may execute each process by operating in cooperation with each other. In addition, display may be performed on a screen by using a projector. Other modifications are conceivable as appropriate within the scope of the present disclosure.

APPENDICES

Explanation of the display device is added below.

The printer 1, which is one example of the display device, includes the CPU 11 that acquires a plurality of images I and a priority object OJ1, selects a target image on which the priority object OJ1 is superimposed from among the plurality of images I, superimposes the priority object OJ1 on the target image, and displays the resulting image. The CPU 11 determines a permission area E2, in which superimposition of a priority object OJ1 is allowed, for each of the plurality of images I and selects a target image from receptive images, in which the priority object OJ1 can be fitted in the determined permission areas E2, among the plurality of images I.

According to this configuration, the printer 1 is configured to determine the permission areas E2, in which superimposition of the priority object OJ1 is allowed, for the plurality of images I, and select the target image, on which the priority object OJ1 is superimposed, from the receptive images in which the priority object OJ1 can be fitted in the determined permission areas E2. Thus, even when overlapping of the priority object OJ1 with a non-permission area E1, in which superimposition of the priority object OJ1 is not allowed, occurs in one image, such overlapping can be avoided by using another image.

In the printer 1 described above, when two or more receptive images are included in the plurality of images I, the CPU 11 may select, as a target image, the image I having the smallest permission area E2 among the two or more receptive images.

According to this configuration, when two or more receptive images are included in the plurality of images I, the printer 1 is configured to select, as a target image, the image I having the smallest permission area E2 among these receptive images. Consequently, the image I having as large non-permission area E1 as possible can be selected as the target image.

In the printer 1 described above, when no receptive image is included in the plurality of images I, the CPU 11 may determine an enlarged permission area E2', which includes the permission area E2 and a blank space generated in the screen area for displaying the image I by reducing the size of each of the plurality of images I, and select a target image from among the enlargement receptive images, in which the priority object OJ1 can be fitted in the determined enlarged permission areas E2', among the plurality of images I.

According to this configuration, when no receptive image is included in the plurality of images I, the printer 1 is configured to determine enlarged permission areas E2' for the plurality of images I and select a target image from among the enlargement receptive images in which the priority object OJ1 can be fitted in the determined enlarged permission areas E2'. Consequently, the possibility that the priority object OJ1 cannot be superimposed on the target image can be lowered.

In the printer 1 described above, when no enlargement receptive image is included in the plurality of images I, the CPU 11 may acquire related objects OJ2 having a smaller display area than that of the priority object OJ1, select a combination of a related object OJ2 and a related receptive image in which the related object OJ2 can be fitted in the permission area E2, respectively from the related objects OJ2 and the plurality of images I, and display the selected target image with the selected related object OJ2 superimposed thereon.

According to this configuration, when no enlargement receptive image is included in the plurality of images I but a related receptive image in which the related object OJ2 can be fitted in the permission area E2 is included in the plurality of images I, the printer 1 is configured to select a combination of a related object OJ2 and a related receptive image in which the related object OJ2 can be fitted in the permission area E2. Consequently, even when a target image on which the priority object OJ1 can be superimposed cannot be selected from the enlargement receptive images, the related object OJ2 can be superimposed and displayed.

In the printer 1 described above, when no receptive image is included in the plurality of images I, the CPU 11 may acquire related objects OJ2 having a smaller display area than that of the priority object OJ1, select a combination of a related object OJ2 and a related receptive image in which the related object OJ2 can be fitted in the permission area E2, respectively from the related objects OJ2 and the plurality of images I, and display the selected target image with the selected related object OJ2 superimposed thereon.

According to this configuration, when no receptive image is included in the plurality of images I but a related receptive image in which the related object OJ2 can be fitted in the permission area E2 is included in the plurality of images I, the printer 1 is configured to select a combination of a related object OJ2 and a related receptive image in which the related object OJ2 can be fitted in the permission area E2. Consequently, even when a target image on which the priority object OJ1 can be superimposed cannot be selected from the receptive images, the related object OJ2 can be superimposed and displayed.

What is claimed is:

1. A display device comprising a processor that executes:
   an acquisition function that acquires a plurality of images and an object to be displayed;
   an image selection function that selects a target image, on which the object is superimposed, from the plurality of images; and
   a display control function that superimposes the object on the target image and displays the resulting image, wherein
   the image selection function determines, for the plurality of images, permission areas on which superimposition of the object is allowed, and selects the target image from among receptive images in which the object can be fitted in the determined permission areas, among the plurality of images.

2. The display device according to claim 1, wherein
   when two or more of the receptive images are included in the plurality of images, the image selection function selects the target image having a smallest permission area from among two or more of the receptive images.

3. The display device according to claim 1, wherein
   when no receptive image is included in the plurality of images, the image selection function determines enlarged permission areas in which blank spaces generated in a screen area for displaying the image by reducing the plurality of images are included in the permission areas, and selects the target image from among enlargement receptive images in which the object can be fitted in the determined enlarged permission areas, among the plurality of images.

4. The display device according to claim 3, further comprising:

a relation selection function that selects a combination of a related object, which has a smaller display area than that of the object, and a related receptive image in which the related object can be fitted in the permission area, respectively from related objects and the plurality of images, wherein the acquisition function acquires related objects when no enlargement receptive image is included in the plurality of images, and the display control function superimposes the selected related object on the selected related receptive image and displays the resulting image.

5. The display device according to claim 1, further comprising:

a relation selection function that selects a combination of a related object, which has a smaller display area than that of the object, and a related receptive image in which the related object can be fitted in the permission area, respectively from related objects and the plurality of images, wherein the acquisition function acquires related objects when no receptive image is included in the plurality of images, and the display control function superimposes the selected related object on the selected related receptive image and displays the resulting image.

6. A non-transitory computer-readable storage medium storing a program, the program making a computer execute:

an acquisition function that acquires a plurality of images and an object to be displayed;

an image selection function that selects a target image, on which the object is superimposed, from the plurality of images; and a display control function that superimposes the object on the target image and displays the resulting image, wherein the image selection function determines, for the plurality of images, permission areas on which superimposition of the object is allowed, and selects the target image from among receptive images in which the object can be fitted in the determined permission areas, among the plurality of images.

* * * * *